United States Patent [19]

Aserin et al.

[11] Patent Number: 5,713,995
[45] Date of Patent: Feb. 3, 1998

[54] LUBRICOUS COATING COMPOSITIONS CONTAINING JOJOBA OIL

[75] Inventors: Abraham Aserin; Nissim Garti, both of Jerusalem; Arnon Shani, Omer, all of Israel

[73] Assignees: Yissum Research Development Company; Ben-Gurion University of the Negev, both of Israel

[21] Appl. No.: 692,120

[22] Filed: Aug. 5, 1996

Related U.S. Application Data

[63] Continuation of Ser. No. 392,327, Feb. 22, 1995, abandoned.

[51] Int. Cl.$^6$ .................................................. C08L 91/00
[52] U.S. Cl. ...................................... 106/252; 106/267
[58] Field of Search .................................... 106/252, 267

[56] References Cited

U.S. PATENT DOCUMENTS

| | | | |
|---|---|---|---|
| 2,524,590 | 10/1950 | Boe | 106/252 |
| 4,329,298 | 5/1982 | Brown et al. | 106/270 |
| 4,356,197 | 10/1982 | Devitt et al. | 426/89 |
| 4,360,387 | 11/1982 | Brown et al. | 106/270 |
| 4,664,821 | 5/1987 | Arndt | 252/56 R |
| 4,806,262 | 2/1989 | Snyder | 252/90 |
| 4,873,008 | 10/1989 | Landis et al. | 252/46.6 |
| 5,064,471 | 11/1991 | Kornman et al. | 106/267 |
| 5,160,665 | 11/1992 | Owada et al. | 252/307 |
| 5,281,266 | 1/1994 | Sheiham et al. | 106/311 |
| 5,306,444 | 4/1994 | Kitamura et al. | 252/546 |

*Primary Examiner*—Jerry D. Johnson
*Attorney, Agent, or Firm*—Sixbey, Friedman, Leedom & Ferguson, P.C.; Gerald J. Ferguson, Jr.; Joan K. Lawrence

[57] ABSTRACT

The present invention relates to lubricous coating compositions comprising as active material natural or synthetic jojoba oil which is optionally partially or completely hydrogenated and/or isomerized, and a solvent or a dispersing system (an organic liquid in which the jojoba oil is immiscible and dispersing agent(s)). The solvent is water or any organic liquid or a mixture of organic liquids that are capable to dissolve molecularly, at least partly, the jojoba oil. The dispersing system comprises jojoba oil immiscible organic liquid(s) together with dispersing agent(s) that enable homogeneous dispersion of the jojoba oil in it. The composition is preferably used for coating a substrate which is selected among polymers or plastics or naturally occurring macromolecules with high hydrophobicity or with low or medium surface energy.

15 Claims, No Drawings

LUBRICOUS COATING COMPOSITIONS CONTAINING JOJOBA OIL

This application is a Continuation of Ser. No. 08/392,327, filed Feb. 22, 1995, now abandoned.

The present invention relates to environmentally-friendly, lubricous coating compositions comprising as active material jojoba oil.

The conventional coating compositions used for various substrates (as defined hereafter) are usually based on a synthetic oil (silicone, mineral oil or other hydrocarbon components) and contain organic solvents such as chlorinated hydrocarbons. Both components are considered "unfriendly" to the environment for several reasons.

Silicone oils, and to a lesser degree mineral oils, do not biodegrade in the environment and thus cause damage to vegetation and animal life as well as they pollute water and soil. Accumulation of such chemicals in the environment may also negatively affect the microorganisms, some of which microorganisms are important to the food chain, in biodegradation of other chemicals and in keeping the biological equilibrium intact. The chlorinated hydrocarbons are prone to atmosphere decomposition, thus having a negative effect on the ozone layer and add to air pollution, from smog and nitrogen oxides in the air.

Another negative effect of silicone oil in the above compositions is the poor performance of said oils in preventing blistering and undercuttings in said substrates, in particular in plastic covers.

There are several compositions in the market which claim the ability to protect, renew, refresh and clean Skay surfaces, dash boards, leather products, and even wood and rubber. Such compositions are, e.g. "Biz", "OttoSun-BI-707", "Tuff Stuff multi purpose", "Teroson Cockpit Spray". However, in all these known compositions silicone oil is used as active ingredient and 1,1,1-trichlorethane as solvent. As indicated above, said compounds are not desirable to be part of such a composition.

It has thus been desirable to find a composition which overcomes the above disadvantages, i.e. which will substitute the silicone and mineral oils, as well as the environmentally unfriendly solvents by environmentally friendly components. Moreover, they should possess strong resistance against vapor transmissions (measured by ASTM D-1653-919). Said compositions should also overcome the other disadvantages of the silicone oil and of the solvent used in the above known compositions. Moreover, they should be easy to prepare and to use, and should not be expensive.

The present invention thus consists in a lubricous coating composition comprising natural or synthetic jojoba oil, which is optionally partially or completely hydrogenated and/or isomerized, and a solvent or a dispersing agent.

The term jojoba oil whenever used herein comprises natural or synthetic jojoba oil which is optionally partially or completely hydrogenated and/or isomerized.

The jojoba oil comprises, substantially, long chain esters having mainly 40–42 carbon atoms and the carboxy-esteric group is well buried in the high lipophilic chains. It is thus imparting the oil as a strong resistant against water and its vapors.

The esters are composed of the following alcohols and acids:

| Alcohols | % | Acids | % |
|---|---|---|---|
| Tetradecanol | trace | Dodecanoic | trace |
| Hexadecanol | 0.1 | Tetradecanoic | trace |
| Heptadec-8-enol | trace | Pentadecanoic | trace |
| Octadecanol | 0.2 | Hexadecanoic | 1.2 |
| Octadec-9-enol | 0.7 | Hexadec-7-enoic | 0.1 |
| Octadec-11-enol | 0.4 | Hexadec-9-enoic | 0.2 |
| Eicosanol | trace | Heptadecenoic | trace |
| Eicos-11-enol | 43.8 | Octadecanoic | 0.1 |
| Heneicos-12-enol | trace | Octadec-9-enoic | 10.1 |
| Docosanol | 1.0 | Octadec-11-enoic | 1.1 |
| Docos-13-enol | 44.9 | Octadecadienoic | 0.1 |
| Tetracos-15-enol | 8.9 | Octadecatrienoic | trace |
| Hexacosenol | trace | Nonadecenoic | trace |
| | | Eicosanoic | 0.1 |
| | | Eicos-11-enoic | 71.3 |
| | | Eicosadienoic | trace |
| | | Docosanoic | 0.2 |
| | | Docos-13-enoic | 13.6 |
| | | Tricosenoic | trace |
| | | Tetracosenoic | trace |
| | | Tetracos-15-enoic | 1.3 |

The formulation of the esters may be varied to a large extent. Suitable esters have the following combination: (The numbers in the table indicate the number of carbon atoms.)

| Wax Ester chain length | Alcohol/Acid Combination | Percentage by GLC and GS-MS |
|---|---|---|
| 34 | 18/16 | 0.1 |
| 36 | 18/18 | 0.1 |
|  | 20/16 | 1.8 |
| 38 | 16/22 | 0.2 |
|  | 18/20 | 1.0 |
|  | 20/18 | 5.4 |
|  | 22/16 | 0.2 |
| 40 | 16/24 | 0.6 |
|  | 18/22 | 1.5 |
|  | 20/20 | 24.3 |
|  | 22/18 | 3.6 |
|  | 24/16 | 0.3 |
| 42 | 18/24 | 1.5 |
|  | 20/22 | 10.5 |
|  | 22/20 | 37.0 |
|  | 24/18 | 1.0 |
| 44 | 20/24 | 0.9 |
|  | 22/22 | 2.1 |
|  | 24/20 | 7.0 |
| 46 | 24/20 | 0.8 |
| 48 | 24/24 | 0.1 |
| 50 | 26/24 | 0.02 |

A distribution of the various chain lengths in one sample of jojoba oil is shown in the annexed chromatogram.

Jojoba oil, (which also includes natural antioxidants, e.g a mixture of tocopherols) is stable toward oxygen and high temperatures because of its chemical structure. The double bond region at the acid and the alcohol components is relatively less active as compared with regular olefins and oxidation at the allylic position is very slow, if at all. These properties make the formulations according to the present invention very protective of polymeric surfaces from deterioration under heat that develops in closed systems. Due to its absorption in the polymeric surfaces it also protects them from the negative effects of cold nights, e.g. in cars.

Synthetic jojoba oil is a mixture of esters of long chain mono unsaturated acids and alcohols having 16–26 carbon atoms, e.g. esters of oleic acid and erucic acid with oleic alcohol or erucyl alcohol which are prepared in the laboratories.

The solvent in connection with the present invention means water or any organic liquid or a mixture of organic liquids that are capable to dissolve molecularly, at least partly, the jojoba oil. The solvent may be, for example,:

1. Any aliphatic hydrocarbon, e.g. isooctane; a mixture of low-boiling hydrocarbons, such as propane-butane and pentane-hexane; GKF such as octane-decane which is obtained from coal by "Sasol" in South Africa; etc.

2. Short or medium chain alcohols, e.g. isopropanol; isobutanol; n-pentanol; etc.

3. Ether alcohols, e.g. cellosolve; carbitol; etc.

4. Other functional solvents such as aldehyde acetals e.g. methylal; ketones, e.g. methyl ethyl ketone; ethers, e.g. ethyl buthyl ether, tetrahydrofuran; esters, e.g. ethyl acetate; ... tetrahydrofuran; etc.

5. Aromatic hydrocarbons, e.g. toluene; etc.

A dispersing system in connection with the present invention comprises jojoba oil immiscible organic liquid(s) that enable homogeneous dispersion of the jojoba oil in it; and dispersing agents. The jojoba oil will be present in said system in the form of droplets.

The dispersing agent may be selected among surfactants, e.g. sorbitan esters; nonyl phenols, e.g. nonyl phenol with 6–10 ethylene oxide units; alkyl sulfosuccinates; phosphate esters; lecithins; alkanolamides; petroleum sulfonates; lignosulfonates; etc.

The composition according to the present invention may also comprise additional compounds, such as fragrances; a shining or glossing compound, e.g. glycerol; glycerol mono oleate; propylene glycol; sorbitol; sorbitan monooleate, etc.

The composition according to the present invention is mainly used as a spray, but is not restricted thereto. In case that it is used as a spray it is packed in a can or the like, together with an environmentally-friendly propulsion agent, e.g. propane, $CO_2$. Freon should not be utilized.

The pressure in the can is variable according to the propellant utilized, e.g. in the case of propane, it is 5–6 atmospheres; in the case of $CO_2$, it is about 8 atmospheres.

In the case that the composition is a spray, the solvent should preferably not exceed a boiling point of 80° C. to allow fast evaporation. The fragrance, if any, should be volatile. The spray may also be applied with a spray gun with air, or with an airless spray gun.

The amount of Jojoba oil being part of the composition may vary, e.g. between 1–80%. The amount may be varied to a large extent and the preferred ratio is 1–12%.

The thickness of the coating layer may vary between 0.1 and 50 mils (2.5–1250 μm). However, the preferred thickness is 0.5–4 mils.

The substrate on which the composition is coated, according to the present invention, means herein polymers or plastics or naturally occurring macromolecules with high hydrophobicity or with low or medium surface energy, such as: polyethylene, polypropylene, PVC and other vinyls, polycarbonates, poly-urethanes, certain polyesters and polyamides, etc., plastics such as composites with a combination of the above (epoxy resins, and carbon fibers). Said substrates are in particular skay, leather, wood, etc.

The composition according to the present invention is prepared in a conventional manner, i.e. by admixing several ingredients.

The present invention will now be illustrated with reference to the following Examples, without being limited by same:

EXAMPLE 1

GKF 8–10 46.5%, mixture of pentane-hexane 46.5%, jojoba oil 5.8%, glycerol 0.5%, fragrances 0.7.

EXAMPLE 2

Isooctane 45%, mixture of pentane-hexane 48%, jojoba oil 5.8%, glycerol 0.5%, fragrances 0.7%.

EXAMPLE 3

GKF 8–10 46%, mixture of pentane-hexane 46%, jojoba oil 5.8%, propylene glycol 1.5%, fragrances 0.7%.

EXAMPLE 4

Isopropanol 91.5%, jojoba oil 6%, sorbitol 1.3%, sorbitan mono oleate 0.5%, fragrances 0.7%.

EXAMPLE 5

GKF 8–10 45%, Methylal 47%, jojoba oil 6%, glycerol 1.3%, fragrances 0.7%.

EXAMPLE 6

Isooctane 45%, propane-butane 47%, jojoba oil 6.5%, glycerol 0.8%, fragrances 0.7%.

EXAMPLE 7

GKF 8–10 41%, mixture of pentane-hexane 47%, jojoba oil 10%, glycerol mono oleate 1%, fragrances 1%.

EXAMPLE 8

Jojoba oil 10%, n-pentanol 44%, dioctyl sodium sulfosuccinate (AOT-100) 25%, water 20%, fragrances 1%.

EXAMPLE 9

Jojoba oil 62.5%, n-pentanol 4.0%, AOT-100 2.5%, water 30%, fragrances 1%.

We claim:

1. An environmentally friendly, water-resistant lubricious coating composition for cleaning and protecting the surfaces of substrates made from synthetic and natural materials, said coating composition consisting of 1 to 80% jojoba oil selected from the group consisting of natural jojoba oil, partially hydrogenated natural or synthetic jojoba oil, completely hydrogenated natural or synthetic jojoba oil, and isomerized natural or synthetic jojoba oil, one or more solvents selected from the group consisting of water, isooctane, a mixture of n-paraffins, isoparaffins and aromatics, propane-butane, pentane-hexane, octane-decane, isopropanol, isobutanol, n-pentanol, ether-alcohols, methylal, methyl ethyl ketone, ethyl butyl ether, tetrahydrofuran, ethyl acetate and toluene and a dispersing system consisting essentially of one or more organic liquids in which the selected jojoba oil is immiscible and one or more dispersing agents selected from the group consisting of sorbitan esters, nonyl phenols, alkyl sulfocuccinates, petroleum sulfonates, lignosulfonates, phosphate esters, lecithins and alkanolimides.

2. The coating composition described in claim 1, wherein the jojoba oil is a synthetic jojoba oil comprising a mixture of esters of long chain mono-unsaturated acids and alcohols with 16–26 carbon atoms.

3. The coating composition described in claim 1, wherein said selected jojoba oil is 1 to 12% of said composition.

4. An environmentally friendly, water-resistant lubricious coating composition for cleaning and protecting the surfaces of substrates made from synthetic and natural materials, said coating composition consisting of 1 to 80% jojoba oil selected from the group consisting of natural jojoba oil, partially hydrogenated natural or synthetic jojoba oil, and isomerized natural or synthetic jojoba oil, one or more solvents selected from the group consisting of water, isooctane, a mixture of n-paraffins, isoparaffins and aromatics, propane-butane, pentane-hexane, octane-decane, isopropanol, isobutanol, n-pentanol, ether-alcohols, methylal, methyl ethyl ketone, ethyl butyl ether, tetrahydrofuran, ethyl acetate and toluene, a dispersing system consisting essentially of one or more organic liquids in which the selected jojoba oil is immiscible and one or more dispersing agents selected from the group consisting of sorbitan esters, nonyl phenols, alkyl sulfocuccinates, petroleum sulfonates, lignosulfonates, phosphate esters, lecithins and alkanolimides and a propellant.

5. An environmentally friendly, water-resistant lubricous coating composition in the form of a spray for cleaning and protecting the surfaces of substrates made from synthetic and natural materials, said coating composition consisting of 1 to 80% jojoba oil selected from the group consisting of natural jojoba oil, partially hydrogenated natural or synthetic jojoba oil, completely hydrogenated natural or synthetic jojoba oil, and isomerized natural or synthetic jojoba oil, one or more solvents selected from the group consisting of water, isooctane, a mixture of n-paraffins, isoparaffins and aromatics, propane-butane, pentane-hexane, octane-decane, isopropanol, isobutanol, n-pentanol, ether-alcohols, methylal, methyl ethyl ketone, ethyl butyl ether, tetrahydrofuran, ethyl acetate and toluene, or, alternatively, a dispersing system consisting of one or more organic liquids in which the selected jojoba oil is immiscible and one or more dispersing agents selected from the group consisting of sorbitan esters, nonyl phenols, alkyl sulfocuccinates, petroleum sulfonates, lignosulfonates, phosphate esters, lecithins and alkanolimides, a propellant, a fragrance, and a shining or glossing agent.

6. The coating composition described in claim 5, wherein 1 to 12% of said composition is a synthetic jojoba oil comprising a mixture of esters of long chain mono-unsaturated acids and alcohols with 16–26 carbon atoms.

7. The coating composition described in claim 5, wherein the propellant is selected from the group consisting of propane and carbon dioxide.

8. The coating composition described in claim 5, wherein the shining or glossing agent is selected from the group consisting of glycerol, glycerol monooleate, propylene glycol, sorbitol, and sorbitol monooleate.

9. The coating composition described in claim 5, wherein the selected solvent has a boiling point not exceeding 80° C., and the fragrance is volatile.

10. The coating composition described in claim 5, wherein said coating composition comprises 45% isooctane, 48% pentane-hexane, 4.8% jojoba oil, 0.5% glycerol, and 0.7% fragrance.

11. A method of providing water resistance and protection to the surface of a selected substrate, including the steps of:
(a) selecting a natural or synthetic substrate; and
(b) applying to said substrate a selected coating thickness of an environmentally friendly, water-resistant coating composition consisting of 1 to 80% jojoba oil selected from the group consisting of natural jojoba oil, partially hydrogenated natural or synthetic jojoba oil, completely hydrogenated natural or synthetic jojoba oil, and isomerized natural or synthetic jojoba oil, one or more solvents selected from the group consisting of water, isooctane, a mixture of n-paraffins, isoparaffins and aromatics, propane-butane, pentane-hexane, octane-decane, isopropanol, isobutanol, n-pentanol, ether-alcohols, methylal, methyl ethyl ketone, ethyl butyl ether, tetrahydrofuran, ethyl acetate and toluene, or, alternatively, a dispersing system consisting essentially of one or more organic liquids in which the selected jojoba oil is immiscible and one or more dispersing agents selected from the group consisting of sorbitan esters, nonyl phenols, alkyl sulfocuccinates, petroleum, sulfonates, lignosulfonates, phosphate esters, lecithins and alkanolimides, a propellant, a fragrance, and a shining or glossing agent.

12. The method described in claim 11, wherein said coating composition is applied to said substrate by spraying.

13. The method described in claim 11, wherein said substrate is selected from the group consisting of polyethylene, polypropylene, vinyl polymers, polycarbonates, polyurethanes, polyesters, polyamides, composites comprising a combination of epoxy resins and carbon fibers, leather and wood.

14. The method described in claim 11, wherein said coating is applied to said selected substrate at a coating thickness of 0.1 to 50 mils.

15. The method described in claim 14, wherein said coating is applied to said selected substrate at a coating thickness of 0.5 to 4 mils.

* * * * *